(12) United States Patent
Davia et al.

(10) Patent No.: US 7,970,793 B2
(45) Date of Patent: Jun. 28, 2011

(54) GENERATING, AND UPDATING CALENDAR EVENTS FROM NON-CALENDAR SOURCES

(75) Inventors: Christopher J. Davia, Mableton, GA (US); Anders Westberg, Spanga (SE)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 12/024,396

(22) Filed: Feb. 1, 2008

(65) Prior Publication Data

US 2009/0198728 A1    Aug. 6, 2009

(51) Int. Cl.
G06F 7/00     (2006.01)
G06F 17/30    (2006.01)

(52) U.S. Cl. .......................................... 707/793; 707/803
(58) Field of Classification Search .............. 707/103 R, 707/793
See application file for complete search history.

(56) References Cited

U.S. PATENT DOCUMENTS

| | | | |
|---|---|---|---|
| 6,369,840 B1 | 4/2002 | Barnett et al. | |
| 6,603,489 B1 * | 8/2003 | Edlund et al. | 715/780 |
| 6,978,246 B1 | 12/2005 | Ruvolo et al. | |
| 2002/0154178 A1 * | 10/2002 | Barnett et al. | 345/853 |
| 2003/0025730 A1 * | 2/2003 | Brennan | 345/760 |
| 2003/0154116 A1 | 8/2003 | Lofton | |
| 2005/0091120 A1 * | 4/2005 | Auletta | 705/26 |
| 2005/0125727 A1 * | 6/2005 | Ramachandran | 715/520 |
| 2006/0277087 A1 | 12/2006 | Error | |
| 2007/0047782 A1 * | 3/2007 | Hull et al. | 382/124 |
| 2008/0046311 A1 * | 2/2008 | Shahine et al. | 705/14 |
| 2008/0052162 A1 * | 2/2008 | Wood | 705/14 |
| 2008/0102889 A1 * | 5/2008 | May et al. | 455/556.2 |
| 2008/0120396 A1 * | 5/2008 | Jayaram et al. | 709/218 |
| 2008/0250334 A1 * | 10/2008 | Price | 715/753 |
| 2009/0157693 A1 * | 6/2009 | Palahnuk | 707/10 |

OTHER PUBLICATIONS

Jordan et al, "Tiger Events: An Online Event Calendar System for Students by Students", ACM / Crossroads / Xrds12-4, vol. 12, Issue 4, Aug. 2006, pp. 1-11, USA.
Lerner, "At the Forge Dynamically Generated Calendars", Linux Journal, vol. 2005, Issue 134, Jun. 2005, 8 pages, USA.
Mynatt et al, "Inferring Calendar Event Attendance", Georgia Institute of Technology, Proceedings of the 6th International Conference on Intelligent User Interfaces IUI'01, Jan. 2001, pp. 121-128, USA.

* cited by examiner

*Primary Examiner* — Don Wong
*Assistant Examiner* — Binh V Ho
(74) *Attorney, Agent, or Firm* — Patrick J. Daugherty; Driggs, Hogg, Daugherty & Del Zoppo Co., LPA

(57) ABSTRACT

Calendar events are pulled from an information source, such as a website, having listed events. A user subscribes to an information source where information containing time-stamped events appears. Alternatively, a user specifies a keyword for searching on the information source. If there are any changes on the information source in regard to a user-specified keyword, the event is automatically linked to the user's calendar. In yet another aspect, a publisher of the information source uses a tag set to tag running text on their information source, e.g. website, such that there is no need for the publisher of an information source to maintain a calendar of the events described in the information source. In yet another aspect, the publisher of the information source is not informed of who subscribes to the information source or what keywords the users specify in regard to the information source to provide user anonymity.

20 Claims, 1 Drawing Sheet

GENERATING, AND UPDATING CALENDAR EVENTS FROM NON-CALENDAR SOURCES

FIELD OF THE INVENTION

The present invention relates to a method, system, and program product for the creation, updating and handling of calendar events.

BACKGROUND OF THE INVENTION

Usually, in order for appointments, meetings, and events to show up on a person's digital calendar, invitations depend upon an organizer sending an invitation to a person known as the recipient. This process is cumbersome when the organizer is scheduling an event that has a variable or unknown number of recipients.

Social networking allows dynamically generated communities to socialize and organize, based on common characteristics. It encourages the trend toward globalization, that is, working together across country boundaries and time zones, to schedule events with a variable or unknown number of participants. Such networking typically uses digital, usually web-based tools.

For example, suppose a person who is researching a topic desires to organize and schedule teleconferences to review his or her findings. Using current technology, the person would need to maintain a list that includes everyone interested in the research. These people would be the recipients of the invitations. The researcher would also have to send digital invitations to every recipient every time a teleconference is scheduled, changed or cancelled. To further add to maintenance concerns, the audience for the teleconference is not a fixed list. Perhaps some people are initially interested in participating, but later do not find the topic interesting, so they do not wish to be invited to future teleconferences. Or, perhaps, through social networking (blogs, wikis, word of mouth, etc), other people, unknown to the researcher, wish to join in on future teleconferences.

Currently, this procedure poses an organizational challenge with the researcher spending considerable time maintaining lists of interested recipients and sending out invitations. Thus, when a person looks at his or her digital calendar, the calendar shows all meetings, teleconferences, events, etc. for a particular duration (one day, two days, one week, a month, etc.).

Some of the prior art relates to methods and systems for creating a calendar in Java for instance. Others describe how to synchronize data over asynchronous data connections in, for example, wearable devices. Still others describe a web server with an integrated or direct scheduling and calendaring capability. One such approach involves a "two step" technique for retrieving non-HTML information to a HTML client (web browser) via an intermediate database.

Systems and methods for creating a filtered information summary based on multiple profiles of each single user are also described in the prior art. They address existent calendar entries, and employ a system to find other information that might be of interest for a user related to the subject of a scheduled meeting. One such system involves the use of a Bayesian model which is an algorithm used to predict the likelihood of a person's attendance of events listed on his or her calendar or schedule. The model is based on the person's attendance history and attributes of calendar events.

Search engines, such as Google, provide a calendar that allows web-site owners to have defined calendar events on their website and a way for users to link up from their own Google calendars.

SUMMARY OF THE INVENTION

In general, the present invention provides a method, system, service provider, and program product for utilizing web-based information for generating and updating calendar events from non-calendar sources. The procedure comprises creating a list of criteria relating to calendar events. A set of HTML tags is generated and is embedded in an internet or intranet information source relating to said criteria. A link-up is created between a user and the information source. A keyword filter is applied to search for information on said source.

Typically, the information in the source contains time-stamped events. The information after being filtered is added to the user's calendar. When changes occur in the filtered information regarding a user-specified keyword, these changes are linked to the calendar of the user. An additional feature may include the use of the HTML tag set to tag running text on the source that is accessible by the user when searching for calendar information. Also, the keywords and the identity of the user typically are maintained in confidentiality. The user defines and subscribes to tags selected by the user.

In another aspect, a method is provided for producing computer executable program code, storing the produced program code on a computer readable medium, and providing the program code to be deployed to and executed on a computer system, for example by a service provider that offers to implement, deploy, and/or perform functions for others. Still further, an article of manufacture comprising a computer usable medium having the computer readable program embodied in said medium may be provided. The program code comprises instructions which, when executed on the computer system, cause the computer system to utilize web-based information from non-calendar sources to generate and update calendar events using a list of criteria relating to calendar events. A set of HTML tags is created to be embedded in an internet or intranet information source relating to said criteria. Said instructions provide a link-up between a user and said information source and apply a keyword filter to search for information on said source.

The invention further utilizes a computer readable medium containing instructions to be implemented on at least one computer processing system. The instructions direct the system to utilize web-based information from non-calendar sources to generate and update calendar events using a list of criteria relating to calendar events. A set of HTML tags is created and is embedded in an internet or intranet information source relating to the criteria. A link-up is provided between a user of the information and the information source. A keyword filter is then applied to search for information on said source.

The invention also relates to a program product including a medium on which a computer program is recorded. The computer program includes the following instructions. A first set of instructions is used to establish a list of criteria relating to calendar events of interest to a user. A second set of instructions provides for collecting web-based information relating to these calendar events from non-calendar sources based on the list of criteria. A third set of instructions serves to create a set of metatags to be embedded in the information sources. A fourth set of instructions provides a link-up between the user and the information source. A fifth set of instructions is used to apply a keyword filter to search for calendar events on the information source. The program product also includes program logic for initiating these sets of instructions to provide the user with a list of events based upon the user-provided criteria.

Instead of requiring the organizer to manage this ever-changing list of recipients, this present invention allows the organizer to maintain only the information about the meeting itself, and not be concerned about who is attending. The recipient list, and the sending of invitations that add or update the recipients' calendar will automatically appear on the calendars of those who are interested, without requiring any effort by the organizer.

This is accomplished through software or hardware that allows a recipient to subscribe or unsubscribe to numerous locations for calendar information. The software or hardware will periodically check these locations for calendar entries and will automatically update the recipient's digital calendar.

The organizer of an event or happening creates calendar entries. One mechanism to do this is through the use of a new set of HTML or XML tags that would be embedded within web pages. These tags describe the calendar entry, and are interpreted by the software or hardware for processing into the recipients' calendar.

The current invention also relates to a new format for describing calendar entries, retrievable from a web-place. The new format is similar to an RSS feed, but is geared specifically for calendar events, not real time streaming news. An RSS is a family of web feed formats used to publish frequently updated content, such as blog entries, news headlines or podcasts. An RSS document is called a 'feed'.

The present invention allows a user to filter calendar entries based on the type of entry, subject, key words, leader, participants, frequency, schedule, time, location, or other data. Using this filter, the user will be presented with only the entries that the user wishes to view, instead of being overwhelmed with seeing a complete listing of all of the users' calendar entries. The unique capability is that the filter list is dynamically generated based on the definitions of the calendar source.

Furthermore, the invention allows the recipient to search numerous digital places for calendar entries that meet search criteria (subject, participants, etc). After finding calendar entries of interest, the recipient can subscribe to them, allowing his or her calendar to automatically process the entries.

There are distinct differences between such a calendar and one supported by an internet search engine according to the prior art. In the present invention, calendar information can be added to any web document using the calendar tag. This calendar tag contains specific event information which can be retrieved via the RSS-like mechanism. Creating and retrieving calendar events in this manner allows the website owner to include calendar event information any place within the website while allowing users to dynamically retrieve and update their own personal calendar with the event information. Since the RSS-like feed is a connection between the user's local calendar and the website, updates to calendaring information on the website are automatically reflected in the user's calendar.

The invention provides a dynamic link between the user's own calendar and any updates to the website. The user can define any part, from any source (not just websites), to be treated as calendar events and dynamically update his or her local calendar. Furthermore, the search engine calendars of the prior art do not include a feature, such as the "filtering capability" of the present invention.

BRIEF DESCRIPTION OF THE DRAWING

These and other features of this invention will be more readily understood from the following detailed description of the various aspects of the invention taken in conjunction with the accompanying drawing in which.

Figure 1:
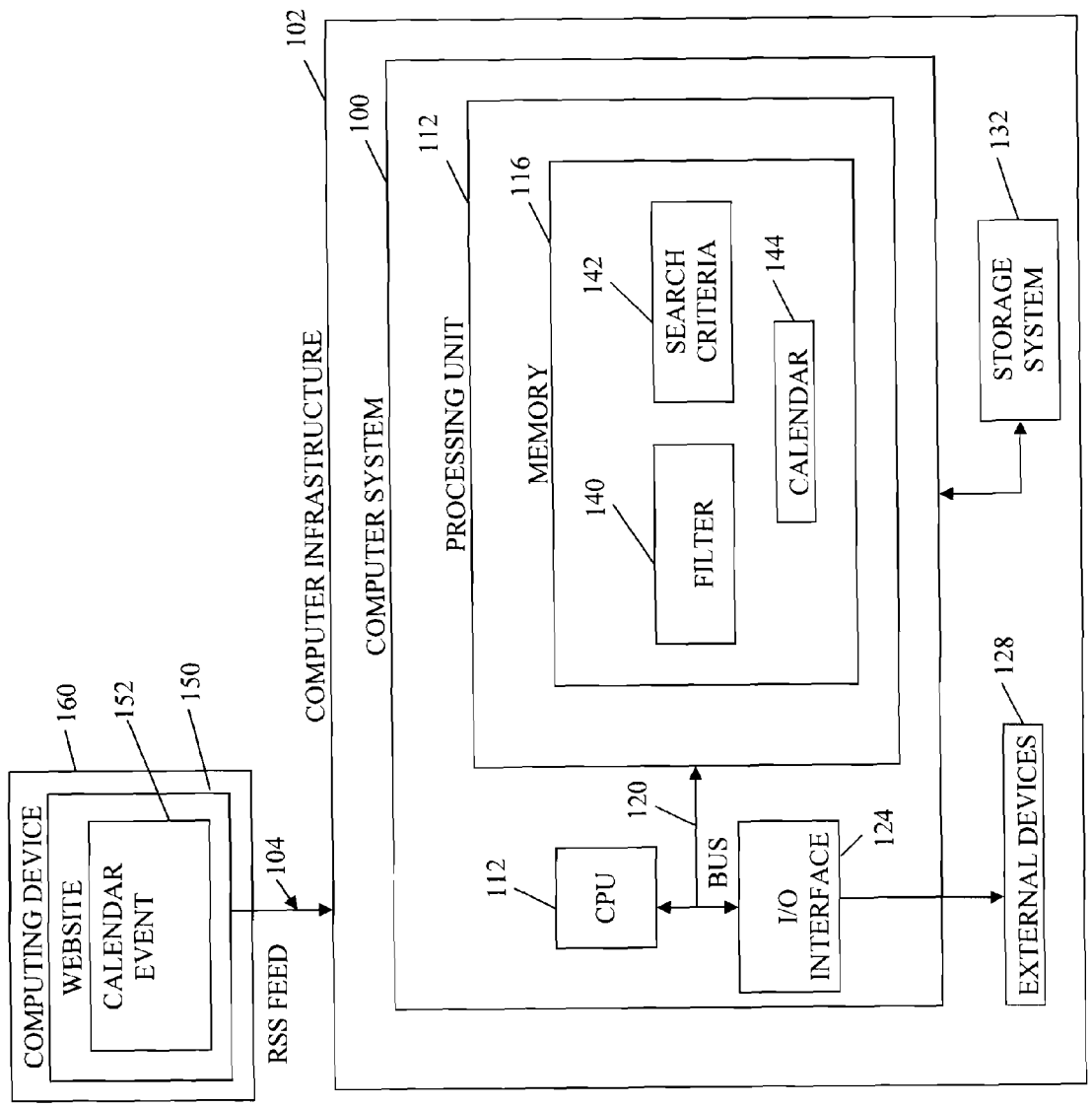
FIG. 1 is a block diagram illustrating an exemplary computerized system and method for implementing the present invention.

The drawing is not necessarily to scale but is merely a schematic representation, not intended to portray specific parameters of the invention. The drawing is intended to depict only typical embodiments of the invention and, therefore, should not be considered as limiting the scope of the invention.

DETAILED DESCRIPTION OF THE INVENTION

The first step is to define a calendar event. This involves the following two basic concepts:

1) A method, and a format, to define which source to pull, method to pull the source and select what in that source to be considered to be time/date, subject, description, and other data. Each of these to be stored in a XML-format at client side.

2) A new mark-up standard to be used on the server side to define parts of information on a web-place that could be potential calendar events to be pulled by clients. One standard set of tags to be included in the HTML code of a page (tags for: When, Subject, Description, and eventual meta-data) and a file-format (in XML) to be stored on a web-server summarizing calendar events offered from this website. This file format and concept are similar to RSS file format and concept. This would make it possible for a web-publisher to "calendar enable" their pages and then users could use a concept similar to how RSS works to "subscribe" to these pages/events. An agent polls defined sources for information, converts into a calendar format (either standard ICAL, or a format for a specific calendar), and adds these events to selected calendar.

The second step is the use of a special viewer that allows for sorting and filtering of calendar events (local and remote) based on keywords which could be part of the definition of the calendar entry source. For example, a listing of all calendar events related to "cultural events" is made. So the user defines a keyword "cultural events", and then defines a set of sources where events of this type can be found. It can be URLs to museum homepages, on-line magazines, RSS feeds, etc. And for each source, the user defines the "filtering rules" which show how to retrieve relevant calendar (e.g. date, time, topic, etc.) information from that source.

The user interface has two modes, a view mode and an edit mode. In view mode, a calendar view is shown, where the user can select range (day/week/month etc) and can select one or more keywords with which to filter the view.

In edit mode, the user is given the opportunity to define new sources and key words.

Workflow of the Solution.

The solution has two stages, init stage and runtime stage.

The init stage defines all keyword and sources the user has in his "profile", and builds the dynamic components used by the runtime stage.

Init Stage:

The solution reads a configuration description in XML (either a file or stored in portal, that is an implementation decision). This XML description contains stanzas for all calendar sources to poll.

Example ini Format:

```
<?XMLversion="1.0"?>
<calendar_sources>
    <calendar_source source 1>
        <source type>
            << keyword >>
        </source type>
        </source access method >
            URL/JDBC/ODBC/File/
        </source access method>
        <source_format>
            "source format"
        </source_format>
        <poll_interval>
            "how often to poll this source"
        </poll _interval>
    </calendar_source source 1>
    <calendar_source source 2>
        <source type>
            << keyword >>
        </source type>
        </source access method >
            URL/JDBC/ODBC/File/
        </source access method>
        <source_format>
            "source format"
        </source_format>
        <poll_interval>
            "how often to poll this source"
        </poll _interval >
    </calendar_source source 2>
</calendar_sources>
<calendar_keyword s>
    <keyword 1>
        << keyword >>
    </keyword 1>
    <keyword 2>
        << keyword >>
    </keyword 2>
</calendar_keywords>
```

The init stage reads the ini-description and builds the dynamic calendar object that contains a description of all sources to poll for calendar data during run time.

During the run time, the backend of the solutions polls the sources at defined intervals and dynamically updates the calendar view as new events occur. Whenever the user chooses to update the solution by add/delete sources and/or keywords, the run-time stage calls the ini-stage and rebuilds the calendar objects.

Differences between the present invention and existent standards and solutions include: (a) In the present invention, the source for the calendar data does not depend on any calendar standards contrasted with known standards and approaches. Instead, the user defines what he/she would like to consider as calendar data; (b) In the present invention, the filtering capability of the user allows the calendar view to be filtered to only see select type(s) of events at any given time; (c) In the present invention, the user can dynamically extend the sources at any time by adding keywords and calendar source to the solution, thereby enabling him or her to dynamically extend the sources, and (d) The "calendar tag" concept of this invention.

The present invention allows the classification of information material/content to be moved from the producer/publisher of the information source ("news article", "calendar event", "learning material", "help database") to be done dynamically by the way a certain individual consumes the information/content. So a "help database" can be a piece of "learning material" that would appear on one's calendar because that is how the person uses it. A submission to a forum discussion could likely be something that the user, as a reader of that forum, would consider to be included in his or her calendar because that submission contains a date and time that the person desires to track related to other things in the calendar. It is a user-centric classification of information found on the web, a classification concept that makes sense to the user.

From the perspective of an information consumer, a user of the present invention does not subscribe to an 'event'. Instead, the user subscribes to an information source (such as a webpage) where information containing time stamps usually appear. Thus, any additions to that source (if it matches the user's keywords) will automatically be linked into the user's calendar.

From the perspective of an information publisher, a publisher of calendar events does not need to maintain a separate calendar on its site. Instead, it can just simply tag (with suggested tag sets) running text on its website.

The following examples are intended to enhance the understanding of the present invention without delimiting the scope of the same.

Example 1

To receive updates of a concert tour of a specified artist or genre of music according to the present invention does not require that the user subscribe to a web source posting information about artists going on tours, and as part of the user's subscription (which is a scheduled pull, unknown to the owner of the website). The user indicates that any new concert tours announced, with artists playing a certain genre (like folk music) should appear in the calendar.

Example 2

Many forums that are focused around specific interests typically have an "Events" section on a Web page, but not in the context of a "calendar". Instead, most often a dedicated forum topic has an agreed upon format that an announcement of an event should have a subject and also date and place as part of the subject, while the body of the message contains more details like time, and also more information about the event itself. Supposing this is something the user would like to track. Any new messages posted to this forum board under this topic in this format would end up in his or her calendar automatically without the need to frequently go to this site and look for updates.

Example 3

In the case of a movie theater listing, a specific format might show announcements of premiers. Inspecting the code of the page, the following code snippet might appear:

```
<select style="width:180" length="20"
onchange="quickSelect(this,'film')">
            <option value="">New movies at SF
    <option value="20070207|11008943">Movie Title 1
    <option value="20070207|16002497">Movie Title 2
```

-continued

```
<option value="20070207|3045218"> Movie Title 3
<option value="20070207|31000307"> Movie Title 4
<option value="20070207|49000259"> Movie Title 5
<option value="20070207|15002444"> Movie Title 6
    </select>
</td>
```

The text (keyword) indicating new films may be marked in one color, such as blue, and the films themselves are listed with name and date for the premier (marked in another color, such as red). This is something that could easily be subscribed to via the present invention method and existing technology.

Example 4

Use of proposed tag language. Examples 1-3 are only related to one of the parts of the present invention, namely, the user defined retrieval of generic information that the user as a consumer of content would like to consider as being "calendar" related. The other part of the invention involves tagging text within the web pages as potential calendar events, without the need to maintain a calendar as such. This can be done by the website owner, thereby resulting in a cost and time saving for the owner.

Taking the code snippet of Example 4, the proposed tags could be included as:

```
<section calendar events format="cal v1.0" source="
http://www.sf.se/premier" title="SF Bio" keywords="movie;cultural">
<select style="width:180" length="20" onchange="quickSelect(this,'film')">
        <option value="">New Movies at SF
    <calendar event keyword="kids"><option value="><calendar
date>20070207(/calendar date>|11008943"><calendar subject> Movie Title 1
</calendar subject>(2/2)</calendar event>
    <calendar event keyword="drama"><<option value="<calendar
date>20070207(/calendar date>||16002497"><calendar subject> Movie Title
3</calendar event>
    <calendar event keyword="comedy"><<option value="<calendar
date>20070207(/calendar date>||3045218"><calendar subject> Movie Title
4</calendar subject> (2/2) </calendar event>
    <calendar event keyword="action"><<option value="<calendar
date>20070209(/calendar date>||49000259"><calendar subject> Movie Title 5
</calendar subject> (2/2) </calendar event>
    <calendar event keyword="action"><<option value="<calendar
date>20070210(/calendar date>||15002444"><calendar subject> Movie Title 6
</calendar subject> (2/2) </calendar event>
        </select>
            </td>
```

And the subscripting definition would then look like this (using the XML format for the calendar retrieval agent described in the invention):

```
<?XMLversion="1.0"?>
<calendar_sources>
    <calendar_source source 1>
        <source type>
            << keyword=movie, action, comedy >>
        </source type>
        <source access method >
            http://www.sf.se/premier
        </source access method>
        <source_format>
            "cal v1.0"
        </source_format>
        <poll_interval>
            "daily, 12:00"
```

-continued

```
        </poll_interval >
    </calendar_source source 1>
</calendar_sources>
```

The result of this is that the user's calendar will be updated every day at noon with anything new from this site. The first time run, given the source as above, his/her calendar will be populated as:

The 7th of February, the user will have an entry with subject: "Premier, SF Movie, Movie Title 4, comedy"
  And the 9th of February, the user will see: "Premier, SF Movie, Movie Title 5, action"
  And last, the 10th of February, the user will have: "Premier, SF Movie, Movie Title 6, action"
None as the other premiers will show up as they do not match the keywords.

Referring now to FIG. 1, an exemplary computerized implementation of the present invention includes computer system 100 which is deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the network environment, communication throughout the network can occur via any combination of various types of communications links. For example, the communication links can comprise addressable connections that may utilize any combination of wired and/or wireless transmission methods. One link that is particularly applicable to the present invention is an RSS feed 104 connecting calendar event information 152 available on a website 150 selected by the user.

Where communications occur via the Internet, connectivity could be provided by conventional TCP/IP socket-based protocol, and an Internet service provider could be used to establish connectivity to the Internet. Still yet, computer infrastructure 102 is intended to demonstrate that some or all of the components of the implementation could be deployed, managed, serviced, etc. by a service provider who offers to implement, deploy, and/or perform the functions of the present invention for others.

As shown, the computer system 100 includes a processing unit 112, a memory 116, a bus 120, and input/output (I/O)

interface 124. Further, the computer system 100 is shown in communication with external I/O devices/resources 128 and storage system 132. In general, the processing unit 112 executes computer program code, such as the code to implement the subscription to an external entity such as an information source, the code of which is stored in memory 116 and/or storage system 132. Also included in memory 116 of computer system 100 are an information filter 140, designated search criteria 142 and a calendar 144. It is to be appreciated that two or more, including all, of the components of this infrastructure may be implemented as a single component, such as a computer chip. Implementation of the memory of computing device 160 comprises calendar event information available from a website 150.

While executing computer program code, the processing unit 112 can read and/or write data to/from memory 116, the storage system 132 and/or the I/O interfaces 124. The bus 120 provides a communication link between each of the components in computer system 100. The external devices 128 can comprise any devices (e.g., keyboard, pointing device, display, etc.) that enable a user to interact with computer system 100 and/or any devices (e.g., network card, modem, etc.) that enable computer system 100 to communicate with the information sources or with one or more other computing devices 160.

The computer infrastructure 102 is only illustrative of various types of computer infrastructures for implementing the invention. For example, in one embodiment, the computer infrastructure may comprise two or more computing devices (e.g., a server cluster) that communicate over a network to perform the various process steps of the invention. Moreover, computer system 100 is only representative of various possible computer systems that can include numerous combinations of hardware.

To this extent, in other embodiments, computer system 100 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 112 may comprise a single processing unit, or be distributed across one or more processing units in one or more locations, e.g., on a client and server. Similarly, the memory 116 and/or the storage system 132 of the computer system 100 can comprise any combination of various types of data storage and/or transmission media that reside at one or more physical locations.

Further, I/O interface 124 can comprise any system for exchanging information with one or more of the external device 128. Still further, it is understood that one or more additional components (e.g., system software, math co-processing unit, etc.) not shown in FIG. 1 can be included in each computer system 100. However, if a computer system comprises a handheld device or the like, it is understood that one or more of the external devices 128 (e.g., a display) and/or the storage system 132 could be contained within the respective computer system, not externally as shown.

The storage system 132 for the computer system 100 can be any type of system (e.g., a database) capable of providing storage for information under the present invention. To this extent, the storage system could include one or more storage devices, such as a magnetic disk drive or an optical disk drive. In another embodiment, the storage system includes data distributed across, for example, a local area network (LAN), wide area network (WAN) or a storage area network (SAN) (not shown). Further, although not shown, additional components, such as cache memory, communication systems, system software, etc., may be incorporated into computer system 100 an/or computing device 160.

While shown and described herein as a method and system for managing conference calls, it is understood that the invention further provides various alternative embodiments. For example, in one embodiment, the invention provides a computer-readable/useable medium that includes computer program code to enable a computer infrastructure to manage conference calls. To this extent, the computer-readable/useable medium includes program code that implements each of the various process steps of the invention.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory and/or the storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage the user's interface with the information sources. In this case, the service provider can create, maintain, support, etc., a computer infrastructure, that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the steps of the present invention. In this case, a computer infrastructure, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What we claim is:

1. A method for utilizing web-based information for generating and updating calendar events from non-calendar sources, comprising
   creating a list of criteria relating to calendar events defining a keyword;
   providing a link-up between a user and at least one information source uniform resource locator address where events of a type of the keyword may be found;
   periodically checking content in a body of a web page at each of the at least one web page uniform resource locator addresses for a presence of a time stamp and applying a keyword filter to search for information in a text format on said source that is tagged with an embedded HTML tag related to the keyword and accessible when searching for the information;
   identifying in the web page content RSS-retrievable specific event information in response to the presence of the time stamp and the embedded tag;
   automatically converting the RSS-retrievable specific event information into a calendar event associated with the keyword and having a time, a date and a subject in a calendar format that is different from the RSS-retrievable specific event information text format;
   adding the calendar event into a user calendar;
   displaying the calendar event to a user of the user calendar in association with the keyword; and
   linking a change in the filtered information regarding a user-specified keyword to the user calendar.

2. The method according to claim 1 wherein the keywords and the identity of the user are maintained in confidentiality.

3. The method according to claim 1 wherein the HTML tags are generated by the list creator and the user defines and subscribes to tags selected by the user.

4. The method according to claim 1 wherein the automatically converting the RSS-retrievable specific event information into the calendar event and updating of the calendar event is performed within a framework of a computer infrastructure.

5. The method of claim 1 wherein the RSS-retrievable specific event information is a set comprising an event announcement, a date, a time and a description, and an XML file format meta-data tag; and
   wherein the calendar format is a format specific for the user calendar.

6. The method of claim 5 wherein the periodically checking the body content of the web page at the at least one web page uniform resource locator addresses further comprising checking for a presence of a calendar tag; and
   wherein the identifying the RSS-retrievable specific event information is further in response to the presence of the calendar tag.

7. The method of claim 6 the adding the calendar event further comprising updating a previous calendar event if the specific event information matches information of the previous calendar event, and comprises a time stamp that is different from a time stamp of the previous calendar event information.

8. The method of claim 7 wherein the keyword comprises a type of entry, a subject, a leader, a participant, a frequency, a schedule, a time, or a location.

9. A system for utilizing web-based information for generating and updating calendar events from non-calendar sources, the system comprising:
   a processing unit, computer readable memory and a computer readable storage system;
   first program instructions to define a list of criteria relating to calendar events and a keyword and specify at least one information source uniform resource locator address where events of a type of the keyword may be found;
   second program instructions to link-up and periodically check content in a body of a web page at each of the at least one information source web page uniform resource locator addresses for a presence of a time stamp and apply a keyword filter to search for information in a text format on said source that is tagged with an embedded HTML tag related to the keyword and accessible when searching for the information; and
   third program instructions to search for the keyword and identify in the at least one information source web page content RSS-retrievable specific event information in response to the presence of the time stamp and the embedded tag, and to automatically convert the RSS-retrievable specific event information into a calendar event associated with the keyword and having a time, a date and a subject in a calendar format that is different from the RSS-retrievable specific event information text format; and
   fourth program instructions to add the calendar event into a user calendar and display the calendar event to a user of the user calendar in association with the keyword, and to link any changes in the filtered information regarding user-specified keywords to the calendar of the user; and
   wherein the first, second, third and fourth program instructions are stored on the computer readable storage system for execution by the processing unit via the computer readable memory.

10. The system according to claim 9 wherein the fourth program instructions are further to maintain the keywords and the identity of the user in confidentiality.

11. The system according to claim 9 wherein the HTML tags are generated by a list creator and the user defines and subscribes to tags selected by the user.

12. The system of claim 9 wherein the second program instructions are further to periodically check the body content of the web page for a presence of a calendar tag; and
   wherein the third program instructions are further to identify the RSS-retrievable specific event information in response to the presence of the calendar tag.

13. The system of claim 12 wherein the fourth program instructions are further to update a previous calendar event if the specific event information matches information of the previous calendar event and comprises a time stamp that is different from a time stamp of the previous calendar event information.

14. A program product including a medium on which a computer program is recorded for utilizing web-based information for generating calendar events, said program product comprising:
   a computer readable storage medium;
   a first set of instructions to establish a list of criteria relating to calendar events of interest to a user and define a keyword;
   a second set of instructions to specify at least one uniform resource locator address where events of a type of the keyword may be found and comprising web-based information relating to said calendar events from non-calendar information sources based on the list of criteria;

a third set of instructions for providing a link-up between said user and said at least one uniform resource locator address non-calendar information source to periodically check content for a presence of a time stamp and apply a keyword filter to identify RSS-retrievable specific event information by searching information in a text format on said source that is tagged with an embedded HTML tag related to the keyword and accessible when searching for the information; and a fourth set of instructions to automatically convert the RSS-retrievable specific event information in the presence of the time stamp and the embedded tag from the text format into a calendar event in a calendar format that is different from the text format, the calendar event associated with the keyword and having a time and a date and a subject, and to add the calendar event into a user calendar and display the calendar event to a user of the user calendar in association with the keyword, and to link any changes in the filtered information regarding user-specified keywords to the calendar of the user; and wherein the first, second, third and fourth program instructions are stored on the computer readable storage medium.

15. The program product of claim 14 wherein the RSS-retrievable specific event information is a set comprising an event announcement, a date, a time and a description, and an XML file format meta-data tag; and wherein the calendar format is a format specific for the user calendar.

16. The program product of claim 15 wherein the third program instructions are further to periodically check the body content of the web page for a presence of a calendar tag; and wherein the third program instructions are further to identify the RSS-retrievable specific event information in response to the presence of the calendar tag.

17. The program product of claim 16 wherein the fourth program instructions are further to update a previous calendar event if the specific event information matches information of the previous calendar event, and comprises a time stamp that is different from a time stamp of the previous calendar event information.

18. A service for utilizing web-based information for generating calendar events, the service comprising:

providing a computer infrastructure that:

creates a list of criteria relating to calendar events and defines a keyword and specifies at least one uniform resource locator address where events of a type of the keyword may be found;

provides a link-up between a user and the at least one information source uniform resource locator address;

periodically checks content in a body of a web page at each of the at least one web page uniform resource locator addresses for a presence of a time stamp and applies a keyword filter to search for information on said source;

identifies in the web page content RSS-retrievable specific event information in response to the presence of the time stamp, the specific event information in a text format;

automatically converts the RSS-retrievable specific event information into a calendar event associated with the keyword and having a time, a date and a subject in a calendar format that is different from the RSS-retrievable specific event information text format;

adds the calendar event into a user calendar; and displays the calendar event to a user of the user calendar in association with the keyword.

19. The service of claim 18 wherein the computer infrastructure further:

periodically checks the body content of the web page at the at least one web page uniform resource locator addresses for a presence of a calendar tag; and identifies the RSS-retrievable specific event information in response to the presence of the calendar tag.

20. A service for utilizing web-based information for generating calendar events, the service comprising:

providing a computer infrastructure that:

creates a list of criteria relating to calendar events and defines a keyword and specifies at least one uniform resource locator address where events of a type of the keyword may be found;

provides a link-up between a user and the at least one information source uniform resource locator address;

periodically checks content in a body of a web page at each of the at least one web page uniform resource locator addresses for a presence of a time stamp and applies a keyword filter to search for information in a text format on said source that is tagged with an embedded HTML tag related to the keyword and accessible when searching for the information;

identifies in the web page content RSS-retrievable specific event information in response to the presence of the time stamp and the embedded tag;

automatically converts the RSS-retrievable specific event information into a calendar event associated with the keyword and having a time, a date and a subject in a calendar format that is different from the RSS-retrievable specific event information text format;

adds the calendar event into a user calendar;

displays the calendar event to a user of the user calendar in association with the keyword; and links a change in the filtered information regarding a user-specified keyword to the user calendar.

* * * * *